United States Patent
Vriezema et al.

(10) Patent No.: US 10,669,425 B2
(45) Date of Patent: Jun. 2, 2020

(54) ONE-POT SYNTHESIS OF REACTIVE DEEP BLACK

(71) Applicant: SPGPrints B.V., Boxmeer (NL)

(72) Inventors: Dennis Manuel Vriezema, Boxmeer (NL); Sigrid Elisabeth Kleine, Boxmeer (NL); Martin Jan Smallegange, Boxmeer (NL)

(73) Assignee: SPGPrints B.V., Boxmeer (NL)

( * ) Notice: Subject to any disclaimer, the term of this patent is extended or adjusted under 35 U.S.C. 154(b) by 0 days.

(21) Appl. No.: 16/604,202

(22) PCT Filed: May 1, 2018

(86) PCT No.: PCT/NL2018/050287
§ 371 (c)(1),
(2) Date: Oct. 10, 2019

(87) PCT Pub. No.: WO2018/203746
PCT Pub. Date: Nov. 8, 2018

(65) Prior Publication Data
US 2020/0115557 A1    Apr. 16, 2020

(30) Foreign Application Priority Data
May 2, 2017 (NL) .................................... 2018826

(51) Int. Cl.
*C09B 62/01* (2006.01)
*C09B 67/22* (2006.01)

(52) U.S. Cl.
CPC ............ *C09B 67/005* (2013.01); *C09B 62/01* (2013.01)

(58) Field of Classification Search
CPC ............................. C09B 67/005; C09B 62/01
USPC ........................................ 534/561, 730, 816
See application file for complete search history.

(56) References Cited

U.S. PATENT DOCUMENTS

| 5,445,654 A | 8/1995 | Hussong et al. |
| 5,508,389 A | 4/1996 | Mischke et al. |
| 7,300,504 B2 | 11/2007 | Shakhnovich |

FOREIGN PATENT DOCUMENTS

| CN | 103788705 A | 5/2014 | |
| CN | 104371367 A | 2/2015 | |
| CN | 105273439 A | 1/2016 | |
| EP | 0 600 322 A2 | 6/1994 | |
| EP | 0600322 A2 * | 6/1994 | ........... C09B 67/005 |
| EP | 0 795 586 A2 | 9/1997 | |
| EP | 0795586 A2 * | 9/1997 | ........... C09B 62/513 |
| JP | H8-127730 A | 5/1996 | |
| JP | H8-310116 A | 11/1996 | |
| JP | 2001-172523 A | 6/2001 | |

OTHER PUBLICATIONS

PCT International Preliminary Report on Patentability, Application No. PCT/NL2018/050287, dated Jul. 26, 2019.

* cited by examiner

*Primary Examiner* — Matthew P Coughlin
*Assistant Examiner* — Sagar Patel
(74) *Attorney, Agent, or Firm* — Hoffmann & Baron, LLP

(57) ABSTRACT

A one-pot synthesis for preparing an aqueous reactive black mixture includes a) dissolving 2-[(4-aminophenyl)sulfonyl]ethanesulfonic acid (vinyl sulphone parabase ester) in water; b) diazotizing the dissolved vinyl sulphone parabase ester using excess nitrous acid or using excess nitrite and an acid, resulting in a diazonium salt and remaining nitrous acid; c) quenching the remaining nitrous acid with sulfamic acid; d) coupling the diazonium salt of step c) with 4-amino-5-hydroxy-2,7-naphthalenedisulfonic acid (H-acid) until the reaction is complete, resulting in Reactive Black 5 (RB 5) and remaining diazonium salt, e) coupling the remaining diazonium salt with 7-acetamido-4-hydroxy-2-naphthalenesulfonic acid (acetyl-J-acid) until the reaction is complete resulting in Reactive Orange 78 (RO 78); and f) obtaining the aqueous reactive black mixture.

10 Claims, 1 Drawing Sheet

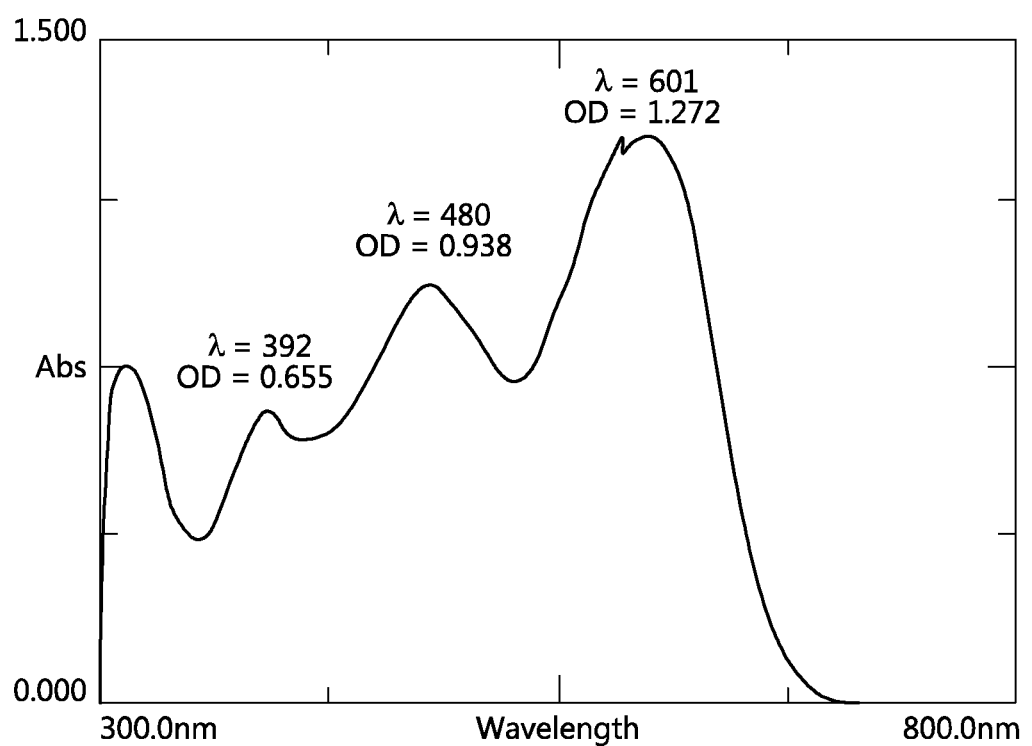

ONE-POT SYNTHESIS OF REACTIVE DEEP BLACK

CROSS-REFERENCE TO RELATED APPLICATIONS

This application is the National Stage of International Application No. PCT/NL2018/050287, filed May 1, 2018, which claims the benefit of Netherlands Application No. 2018826, filed May 2, 2017, the contents of which is incorporated by reference herein.

TECHNICAL FIELD

The current invention relates to a one-pot synthesis for preparing an aqueous reactive black mixture and the use of an aqueous reactive black mixture for inkjet printing.

BACKGROUND ART

As a consequence of pi delocalization, aryl substituted azo compounds have vivid colors, especially reds, oranges, and yellows. Therefore, they are used as dyes, commonly known as azo dyes.

For the printing of textile, many different azo dyes have been developed. Cotton is often printed with reactive dyes. Due to the presence of a reactive group in these dyes, they are able to form a covalent bond with a hydroxyl group in the cellulose of the cotton. Due to this bond, the dye stays bound to the textile during washing.

Commonly azo dyes are prepared by first reacting an aromatic amine with a nitrite to form a diazonium salt. This diazonium salt can then be coupled with a coupling component to form the azo dye. The preparation of concentrated solutions of azo dyes is difficult because the required diazotization and coupling reactions give rise to very viscous phases which lead to serious stirring problems, or even make stirring completely impossible. In practice, the diazotization and coupling reactions are therefore often carried out in dilute aqueous solutions, and the dye content is concentrated only afterwards. This results in the need for large equipment and high amounts of water, which need to be removed afterwards. This is undesirable from an economic and environmental point of view.

A further disadvantage of currently used synthesis methods is that high amounts and many types of inorganic salts are used during the synthesis, which remain in the dyes as inorganic impurities. For application as inks for digital textile printing, the presence of these salts is undesirable. These salts can deposit on the print head, which results in reduced print quality. Although it is possible to largely remove the salts from the dyes, e.g. by reverse osmosis, this results in an extra process step which requires the use of expensive equipment and vast amounts of water.

Besides salts, organic impurities such as side-products from the synthesis steps and unreacted reagents are often present in dyes produced by current synthesis methods. These side products may need to be removed, which results in extra process steps and the need for additional materials and equipment. Even if the side products do not need to be removed, the formation of side products is undesirable as it diminishes the yield of the dye. This needlessly increases the costs of the used reagents to achieve a certain synthesis yield.

In order to achieve the desired shades of a specific color, such as black, it is well known to mix different azo compounds. The color of a mixture is determined by the specifically used compounds, as well as their relative amounts. Even slight deviations in relative amounts, for example changing the ratio of two dyes from 2.5:1 to 2.4:1, can lead to color differences which are readily noticeable by the human eye. Mixtures of dyes are commonly prepared by mixing individually prepared dyes in the desired relative amounts. Needless to mention, many process and purification steps are required to produce a desired dye mixture. The resulting dye mixtures often contain a high amount of impurities in the form of salts and organic impurities.

In order to make the synthesis more efficient, preparing dye mixtures from common building blocks without intermediate purification steps is advantageous. Such reaction processes which are performed consecutively in the same reaction vessel are also identified as one-pot processes. It has previously been described to prepare dye mixtures by a one-pot process using appropriate mixtures of diazo and coupling components. For example, EP 0600322 A2 discloses such a one-pot process. Because the reaction steps for the synthesis of dye mixtures are performed consecutively, meaning without intermediate purification steps, the amount of isolation and purification steps is reduced. This results in a simpler and more efficient process. The dyes do not have to be produced in separate steps and the step of mixing the dyes in the required proportions can be skipped. However, in such combined syntheses, the formation of viscous phases may play an even bigger role.

Thereto, U.S. Pat. No. 5,508,389 describes the addition of viscosity reducing agents to reactions in which dye mixtures are prepared from common building blocks without intermediate purification steps. The use of viscosity reducing agents lessens the problem of viscous phase formation. However, these viscosity reducing agents form an impurity which needs to be removed before the dye can be used in an ink-jet printer, and their use is therefore not desirable.

Besides viscosity, also the stability of the reaction mixtures used in preparing azo dyes can be an issue. In order to prevent demixing of the different phases, U.S. Pat. No. 7,300,504 discloses the use of a high shear mixer in the synthesis of inkjet ink compositions comprising a liquid vehicle, e.g. water, and a modified azo pigment. The modified azo pigment comprises the reaction product of at least one diazonium reagent and at least one azo coupler. The inkjet ink composition does not include a separate dispersant which needs to be removed before the inkjet ink composition can be used. U.S. Pat. No. 7,300,504 does not disclose the synthesis of azo dye mixtures, nor does it disclose any viscosity related effects.

As mentioned above, the usual procedure for the preparation of azo dyes is to diazotize an amine employed as diazo component in a first step and then, in a second step, to react the diazotized amine with the appropriate coupling component. The diazotization is normally carried out in a mineral acid solution by adding an excess of nitrite, e.g. sodium nitrite. When diazotization is complete, the excess nitrite is preferably removed before the azo coupling takes place. This removal may be effected by adding a small amount of non-diazotized amine or by adding urea or amidosulfonic acid (sulfamic acid). This has for example been disclosed in EP 0795586 A2. However, as disclosed in U.S. Pat. No. 4,845,638 sulfamic acid acts rapidly, but a disadvantage is that if an excess of sulfamic acid is added, it may result in secondary reactions. Use of sulfamic acid for the destruction of nitrite is therefore not self-evident.

A particularly desirable dye mixture is a mixture of Reactive Black 5 (RB 5) and Reactive Orange 78 (RO 78). Such a mixture provides for deep shades of black.

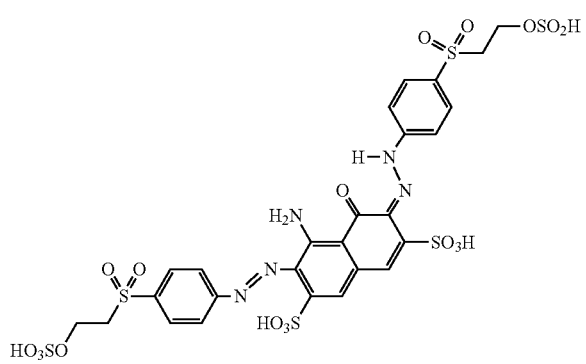

Reactive Black 5 (RB5)

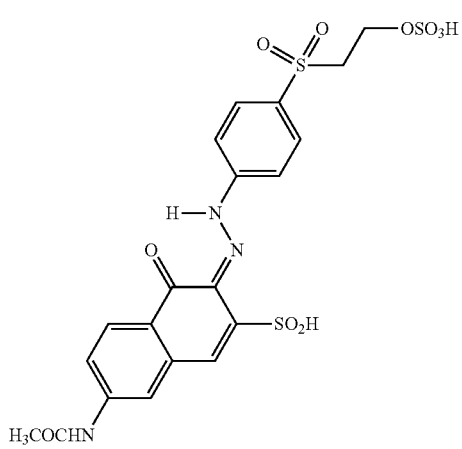

Reactive Orange 78 (RO 78)

The above structures can also exist in their salt forms, in which the H-atoms in the OSO$_3$H groups are replaced with an alkali metal, such as lithium, sodium or potassium.

Mixtures of RB 5 and RO 78 for dyeing textiles are known from e.g. CN 105273439 A, JP 2001 172523 A, and JPH 08127730 A. However, these documents all relate to mixtures of individually prepared dyes, and as such these mixtures suffer from all the above mentioned disadvantages. For example, due to the individual synthesis of RB5 and RO78, more synthesis steps are needed to prepare the mixtures, thus preparation of the mixtures is not efficient. Moreover, the resulting mixtures of individually prepared dyes suffer from high impurity levels, such as high salt concentrations and other organic and/or inorganic impurities.

SUMMARY OF INVENTION

The present invention aims to overcome the abovementioned drawbacks in the synthesis of mixtures of Reactive Black 5 and Reactive Orange 78. Therefore, it is an objective of the invention to perform the reactions to synthesize the dyes in concentrated solutions. It is another objective of the current invention to reduce the amount of inorganic salt in the dye mixture. It is a further objective of the invention to reduce organic impurities in the dye mixture. It is another objective of the present invention to provide a process for the preparation of the dye mixture with a reduced amount of process steps as compared to preparing the mixture of dyes from individually prepared dyes. It is another objective of the present invention to perform the dye synthesis reactions in the absence of additional viscosity reducing agents. It is another objective of the invention to perform the dye synthesis reactions in the absence of a separate dispersant.

To reach at least one of said objectives, in a first aspect the present invention provides a One-pot synthesis for preparing an aqueous reactive black mixture, comprising the following steps a)-f):

a) dissolving 2-[(4-aminophenyl)sulfonyl]ethanesulfonic acid (vinyl sulphone parabase ester) in water;

b) diazotizing the dissolved vinyl sulphone parabase ester using excess nitrous acid or using excess nitrite and an acid, resulting in a diazonium salt and remaining nitrous acid;

c) quenching the remaining nitrous acid with sulfamic acid;

d) coupling the diazonium salt of step c) with 4-amino-5-hydroxy-2,7-naphthalenedisulfonic acid (H-acid) until the reaction is complete, resulting in Reactive Black 5 (RB 5) and remaining diazonium salt, e) coupling the remaining diazonium salt with 7-acetamido-4-hydroxy-2-naphthalenesulfonic acid (acetyl-J-acid) until the reaction is complete resulting in Reactive Orange 78 (RO 78); and f) obtaining the aqueous reactive black mixture, wherein steps a) to e) are performed without intermediate purification and at least steps d) and e) are performed under high shear mixing conditions, and
the combined concentration of RB 5 and RO 78 at the end of step e) is higher than 0.1 mol/L.

In a second aspect, the invention provides for the use of an aqueous reactive black mixture thus prepared in textile dying.

Thus, in the present invention a one-pot synthesis for preparing an aqueous reactive black mixture comprising RB 5 and RO 78 is performed with the use of a high shear mixer. Destruction of excess nitrite is conducted with sulfamic acid. The present invention provides for a simple process, requiring a minimal amount of process steps and a minimal amount of reactants. The dye mixture is produced without intermediate separation and/or purification steps, and the reactions are performed in a concentrated solution without the need for any viscosity reducing agents and/or separate dispersants. Surprisingly, due to the combined effect of the above mentioned measures (one-pot process, high shear mixing, destruction with sulfamic acid) the amount of impurities in the reaction product can be highly reduced as compared to conventional processes, e.g. a process in which the dyes are synthesized separately, and combined afterwards. As opposed to conventional processes it is possible that only a small amount of impurities, such as organic impurities and/or salts, remain in the end product, whereas with the prior art process many different impurities remain. Moreover, the decrease in impurity level is greater than what can be expected based on the combination of individual measures. If either high shear mixing or destruction with sulfamic acid is omitted from the one-pot synthesis process, then the resulting dye mixture is significantly less pure than expected. The interaction of the high shear mixing and destruction with sulfamic acid provides a synergistic effect.

DESCRIPTION OF EMBODIMENTS

The invention may be illustrated by the following reaction schemes:

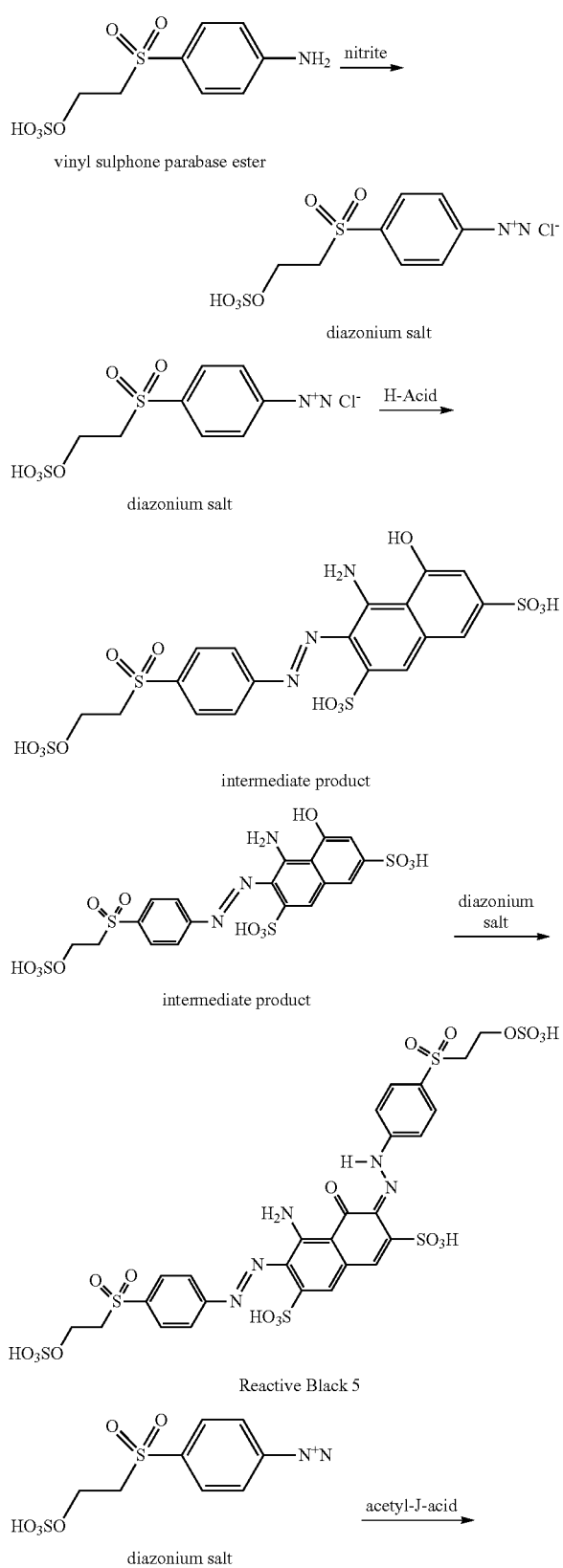

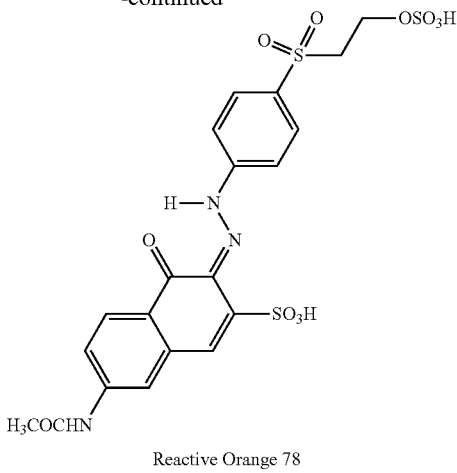

Reactive Orange 78

A typical one-pot synthesis for preparing an aqueous reactive black mixture according to the present invention comprises the above mentioned steps a)-f). Steps a) to e) are performed without intermediate purification and at least steps d) and e) are performed under high shear mixing conditions.

High shear mixing can be executed in any equipment capable of providing high shear mixing conditions. Such equipment is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. Thus, as used herein for the method of the present invention, high shear mixing means mixing conditions having sufficient energy to produce an intimate mixture of used chemicals and water. The high shear mixers may be either batch, semi-continuous, or continuous mixers. A continuous mixer offers both economic and practical advantages to batch processing equipment and would be generally preferred. Due to the use of high shear mixing conditions, the combined concentration of RB 5 and RO 78 at the end of step e) can be higher than 0.1 mol/L.

Due to the combination of the differentiating features of the current invention, the resulting mixture of RB 5 and RO 78 surprisingly results in a product with an increased purity as compared to prior art RB 5 and RO 78 mixtures.

In a typical reaction, first 2-[(4-aminophenyl)sulfonyl] ethanesulfonic acid (vinyl sulphone parabase ester) is diazotized. Such diazotization reactions are well-known in the art, and can for example be achieved by reacting the vinyl sulphone parabase ester with nitrosyl sulfuric acid or nitrous acid. Usually the nitrous acid is generated in situ from sodium nitrite and a mineral acid. Preferably the reaction is performed with sodium nitrite in an acid solution, preferably hydrochloric acid.

In aqueous solution diazonium salts are unstable at temperatures above 5° C. Therefore, reactions are preferably performed at temperatures between 0 and 5° C. Such reaction temperatures can for example be achieved by performing these reactions in ice/water mixtures. Additionally or alternatively, external cooling can be employed. For example, the reaction can be executed in a reaction vessel which is externally cooled by a cooling bath.

In an embodiment of the current invention vinyl sulphone parabase ester is suspended in water, optionally a mixture of ice and water, and stirred at a temperature between 0 and 5° C. An acid solution, such as 37% HCl is then added. Preferably, the pH of the resulting mixture is at most 2. In order to perform the diazotization, a nitrite salt solution, preferably sodium nitrite in water, is then added. Stirring is preferably continued until complete diazotization has occurred. The temperature is preferably kept below 5° C., i.e. between 0 and 5° C.

Preferably, in step b) the molar ratio of vinyl sulphone parabase ester:nitrite is within the range of 1:1.001-1:1.2. Addition of an excess of nitrite results in complete diazotization of the vinyl sulphone parabase ester, thus no unreacted vinyl sulphone parabase ester will remain. However, too much of an excess of nitrite results in a high amount of nitrous acid remaining after the diazotization. This is disadvantageous, as this remaining nitrous acid can have undesirable effects on the further reaction steps. Therefore, the remaining nitrous acid should be quenched. Higher amounts of remaining nitrous acid result in the need of additional quenching material, which is undesirable from an economic point of view. Furthermore, it leads to an undesirable increased amount of impurities.

Preferably, in the quenching step (step c)), the molar ratio of remaining nitrous acid:sulfamic acid is within the range of 1:1-1:2. The ratio should at least be 1:1 for quenching of all remaining nitrous acid. Higher amounts of sulfamic acid do not provide for a specific benefit in the quenching reaction, but increases the amount and therefore cost of the used sulfamic acid. Furthermore, it results in an extra impurity in the final product. During quenching, the reaction temperature is advantageously kept between 0 and 5° C.

In the target mixture of RB 5 and RO 78, the ratio RB 5:RO 78 is preferably within the range of 1.3:1 to 1.7:1. Such mixtures provide for acceptable black colouring when used as reactive dyes. More preferably, the ratio of RB 5 and RO 78 is in the range of 1.4:1 to 1.6:1. Such ratio's provide for deep black colouring. For an optimal deep black colouring effect, preferably this ratio is in the range of 1.45:1 to 1.50:1.

H-acid can be added, for example as an aqueous suspension, immediately after quenching the remaining nitrous acid with sulfamic acid. Preferably the reaction temperature is between 0 and 5° C. Related to the above mentioned ratios of RB 5:RO 78, in step d) the molar ratio of diazonium salt:H-acid is preferably within the range of 2.6:1 to 2.8:1. This will result in a ratio of RB 5:remaining diazonium salt of 1.7:1 to 1.3:1. More preferably, the molar ratio of diazonium salt:H-acid is within the range of 2.6:1 to 2.7:1.

After all H-acid has been consumed, the reaction can be continued by adding acetyl-J-acid to the reaction mixture (step e). Acetyl-J-acid can be added in the form of an aqueous slurry. As acetyl-J-acid is a valuable resource which is less easy to prepare than the diazonium salt, the diazonium salt is preferably present in at least equimolar amounts at the beginning of step e). In this way all acetyl-J-acid can react to form RO 78. More preferably, the remaining diazonium salt is present as an excess, to ensure that all acetyl-J-acid will react to form RO 78. Most preferably, in step e) the molar ratio of remaining diazonium salt:acetyl-J-acid is within the range of 1.0:1-1.2:1. Lower relative amounts of diazonium salt lead to an undesirable excess of acetyl-J-acid, whereas higher relative amounts of diazonium salt result in a too high surplus of diazonium salt. This needs to be removed from the resulting dye mixture and results in unnecessary costs and/or purification steps. The pH of the reaction of step e) is preferably adjusted to pH 5, for example through the addition of a sodium carbonate solution. Optionally, the pH is checked during the reaction, and re-adjusted if necessary.

Preferably, steps a) to e) are performed in the same reaction vessel as this enables to make full advantage of the one-pot process properties of the current invention.

The current invention further provides for the use of an aqueous reactive black mixture prepared according to the above mentioned process in textile dying, i.e. a process of adding color to textile products.

Preferably, the dye mixtures according to the invention are used in printing of textiles.

More preferably, the dye mixtures according to the invention are used in inkjet printing of textiles.

Example

To prepare a target Mixture of 0.1475 mole of Black 5 and 0.1 mole of Orange 78, vinyl sulphone parabase ester (115.5 g) was suspended in ice/water (1 l) and stirred at 0-5° C. whilst 37% HCl (80.2 g, 68 ml, 0.814 mole) was added. To this was then added a solution of sodium nitrite (28.0 g, 0.406 mole) in water (100 ml) over ~15 min's at the same temperature, maintained through external cooling. The mixture was stirred for 1 h at 0-5° C. and then analyzed by HPLC, which showed no starting material remained, indicating complete diazotization had occurred.

Excess nitrous acid was quenched by the addition of sulfamic acid (1 g). H-Acid (59.1 g, 0.1475 mole) was suspended well in water (100 ml) and the suspension added to the above diazotization reaction. After 3 h stirring using a Silverson L5M-A high shear mixer at 0-5° C., paper run-out with diazo-PNA stain, indicated that all H-acid had been consumed.

The acetyl-J-acid slurry prepared in Step 1 (135 g, 0.1 mole) was adjusted to pH 5 with 2N HCl and then added to the reaction. Over ~30 minutes, the reaction was adjusted to pH 5 through the addition of 2M sodium carbonate solution (180 ml required). The reaction was then stirred overnight using a Silverson L5M-A high shear mixer at pH 5.0 allowing it to warm up to room temp. No further alkali or acid solution was required to maintain pH 5 overnight. The total reaction volume was about 2 liter. Table 1 gives an overview of the reactants that were used.

TABLE 1

| | Reactants | | |
|---|---|---|---|
| Materials | Mol. Weight (g/mol) | Mass (g) | Moles |
| Vinyl sulphone parabase ester | 286.5 | 115.5 | 0.403 |
| H-Acid | 401 | 59.1 | 0.1475 |
| Sodium nitrite | 69 | 28.0 | 0.406 |
| N-Acetyl-J-acid | 1365 | 136.5 | 0.1 |
| 37% HCl | 98.6 | 80.2 | 0.814 |
| 2M Na$_2$CO$_3$ solution | | 180 ml | 0.36 |
| Sulfamic acid | 97.1 | 1 | 0.01 |

For convenience, the total reaction liquor was freeze dried to give a black solid which was slurried in acetone to homogenise and to render it more handleable, meaning less static, less dusty, and having less volume. The solid was filtered off and dried at 40° C. under vacuum overnight.

The dye content was analyzed by nitrogen content obtained from micro analysis. As the dye sample will contain extra carbon from residual acetate and sodium carbonate, the % dye content is calculated from the nitrogen content, obtained by micro analysis.

$Mw_{Black5}$=903.89 g/mol; $m_{Black5}$=0.1475 mol×903.89 g/mol=133.3 g $Mw_{Orange78}$=573.57 g/mol; $m_{Orange78}$=0.1 mol×573.57 g/mol=57.4 g Both dyes: 133.3 g+57.4 g=190.7 g dye mixture expected Expected nitrogen content: (0.1475 mol×5 N-atoms in Black 5+0.1 mol×3 N-atoms in Orange 78)× 14.007÷190.7=7.62%

Found nitrogen content: 4.90%

Dye content=4.90%÷7.62%=64.3%

Thus, the total mass of freeze dried solid was 283.2 g at 64.3% strength which corresponds to 182.1 g at 100% strength. The solid dye mixture was analyzed using UV-Vis as an aqueous solution of 10 ppm (see FIG. 1: UV-Vis spectrum of the resulting product) and HPLC (see Tables 2 and 3).

In FIG. 1:

λ=601 nm: A/g=23.2 at 64.3% strength corresponding to A/g=36.1 at 100% strength

λ=480 nm: A/g=17.1 at 64.3% strength, corresponding to A/g=26.6 at 100% strength λ=392 nm: A/g=12.0 at 64.3% strength, corresponding to A/g=18.6 at 100% strength Analytical HPLC measurements were performed on a Waters Acquity UPLC equipped with PDA and MS detectors. The used column was a Waters Acquity Phenyl BEH column (1.7 μm, 2.1×150 mm). The column was maintained at 20° C. Eluent A consisted of 5% formic acid buffer (pH 3) in acetonitrile, and eluent B consisted of 5% formic acid buffer (pH 3) in water. The injection volume was 10 microliter, and the flow rate was 0.5 mL/min. The analysed samples were dissolved in water and diluted in water to a concentration of 100 ppm. The used gradient is summarized in Table 2.

TABLE 2

HPLC gradient

| Time (min.) | Eluent A (%) | Eluent B (%) |
|---|---|---|
| 0 | 20 | 80 |
| 1 | 20 | 80 |
| 8 | 80 | 20 |
| 10 | 80 | 20 |
| 12 | 20 | 80 |
| 14 | 20 | 80 |

TABLE 3

HPLC analysis of dye mixture prepared according to example 1 (λ = 478 nm)

| | RT | Area | Height | % Area |
|---|---|---|---|---|
| 1 | 6.911 | 3626 | 588 | 0.17 |
| 2 | 7.173 | 945 | 375 | 0.04 |
| 3 | 7.758 | 624337 | 45188 | 29.38 |
| 4 | 8.702 | 1173514 | 342091 | 55.22 |
| 5 | 8.874 | 28186 | 9640 | 1.33 |
| 6 | 8.927 | 25138 | 6271 | 1.18 |
| 7 | 9.025 | 21796 | 5712 | 1.03 |
| 8 | 9.143 | 5584 | 1219 | 0.26 |
| 9 | 9.255 | 61731 | 20960 | 2.90 |
| 10 | 9.411 | 1649 | 430 | 0.08 |
| 11 | 9.771 | 12439 | 2689 | 0.59 |
| 12 | 9.957 | 11842 | 4617 | 0.56 |

TABLE 3-continued

HPLC analysis of dye mixture prepared according to example 1 (λ = 478 nm)

| | RT | Area | Height | % Area |
|---|---|---|---|---|
| 13 | 10.391 | 84935 | 26625 | 4.00 |
| 14 | 10.665 | 35814 | 6574 | 1.69 |
| 15 | 10.982 | 2979 | 521 | 0.14 |
| 16 | 11.198 | 948 | 486 | 0.04 |
| 17 | 11.447 | 1118 | 439 | 0.05 |
| 18 | 11.875 | 1670 | 421 | 0.08 |
| 19 | 12.036 | 825 | 275 | 0.04 |
| 20 | 12.156 | 18845 | 6348 | 0.89 |
| 21 | 12.651 | 968 | 349 | 0.05 |
| 22 | 12.723 | 2429 | 784 | 0.11 |
| 23 | 13.841 | 555 | 240 | 0.03 |
| 24 | 13.964 | 1319 | 399 | 0.06 |
| 25 | 14.195 | 1998 | 565 | 0.09 |
| 25 | 14.195 | 1998 | 565 | 0.09 |

Comparative Example

In a comparative experiment, a mixture of RB 5 and RO 78 was prepared by mixing commercially available RB 5 and commercially available RO 78 in a ratio of RB 5:RO 78 of 1.48:1. HPLC analysis was performed using an identical analysis method as described for the above example (see Table 4).

TABLE 4

HPLC analysis of dye mixture of individually prepared RB 5 and RO 78 (λ = 478 nm)

| | RT | Area | Height | % Area |
|---|---|---|---|---|
| 1 | 6.865 | 4379 | 599 | 0.14 |
| 2 | 7.490 | 565 | 290 | 0.02 |
| 3 | 7.719 | 749685 | 59371 | 24.76 |
| 4 | 8.622 | 9512 | 2765 | 0.31 |
| 5 | 8.685 | 1559417 | 408577 | 51.50 |
| 6 | 8.942 | 34752 | 4912 | 1.15 |
| 7 | 9.223 | 4803 | 1236 | 0.16 |
| 8 | 9.285 | 3416 | 1429 | 0.11 |
| 9 | 9.337 | 10174 | 3427 | 0.34 |
| 10 | 9.804 | 2903 | 1308 | 0.10 |
| 11 | 9.824 | 4894 | 1506 | 0.16 |
| 12 | 9.952 | 18627 | 6986 | 0.62 |
| 13 | 10.379 | 105732 | 32911 | 3.49 |
| 14 | 10.645 | 54802 | 9306 | 1.81 |
| 15 | 10.915 | 3710 | 1267 | 0.12 |
| 16 | 11.041 | 3615 | 1266 | 0.12 |
| 17 | 11.079 | 868 | 349 | 0.03 |
| 18 | 11.195 | 719 | 304 | 0.02 |
| 19 | 11.757 | 833 | 324 | 0.03 |
| 20 | 12.018 | 7995 | 2589 | 0.26 |
| 21 | 12.128 | 431446 | 143164 | 14.25 |
| 22 | 12.509 | 591 | 248 | 0.02 |
| 23 | 12.674 | 2477 | 787 | 0.08 |
| 24 | 13.098 | 766 | 392 | 0.03 |
| 25 | 13.536 | 853 | 258 | 0.03 |
| 26 | 13.827 | 8351 | 2806 | 0.28 |
| 27 | 13.960 | 2040 | 492 | 0.07 |

A comparison of the analyses of the example according to the present invention and the comparative example reveals that the dye mixture as prepared according to the present invention comprises less impurities. The most predominant difference is the vast reduction in the impurity eluting at around 12.13 min. It is believed that this impurity is monohydrolysed RB 5:

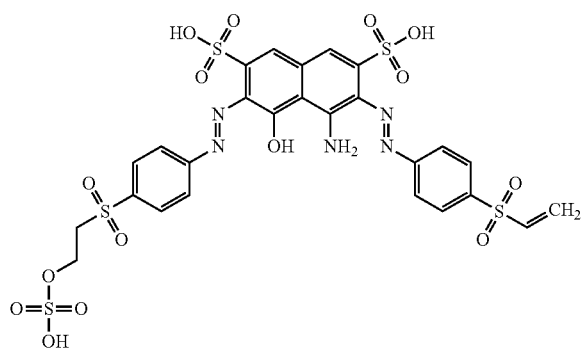 [SMILES: C=CS(=O)(=O)c1ccc(/N=N/c2c(S(=O)(=O)O)cc3cc(S(=O)(=O)O)c(/N=N/c4ccc(S(=O)(=O)CCOS(=O)(=O)O)cc4)c(O)c3c2N)cc1]

The one-pot synthesis according to the present invention surprisingly leads to a vast reduction of the above mentioned impurity.

TABLE 3

Comparison of HPLC Analyses of mixtures of RB 5 and RO 78 ($\lambda$ = 478 nm)

| RT (min.) | Presence in dye mixture of individually prepared RB 5 and RO 78 (%) | Presence in dye mixture prepared according to example (%) | Component |
|---|---|---|---|
| 7.7 | 24.76 | 29.38 | RB 5 |
| 8.7 | 51.50 | 55.22 | RO 78 |
| 12.13 | 14.25 | 0.89 | Impurity |

The invention claimed is:

1. A one-pot synthesis for preparing an aqueous reactive black mixture, comprising the following steps a)-f):
   a) dissolving 2-[(4-aminophenyl)sulfonyl]ethanesulfonic acid (vinyl sulphone parabase ester) in water;
   b) diazotizing the dissolved vinyl sulphone parabase ester using excess nitrous acid or using excess nitrite and an acid, resulting in a diazonium salt and remaining nitrous acid;
   c) quenching the remaining nitrous acid with sulfamic acid;
   d) coupling the diazonium salt of step b) with 4-amino-5-hydroxy-2,7-naphthalenedisulfonic acid (H-acid) until the reaction is complete, resulting in Reactive Black 5 (RB 5) and remaining diazonium salt,
   e) coupling the remaining diazonium salt with 7-acetamido-4-hydroxy-2-naphthalenesulfonic acid (acetyl-J-acid) until the reaction is complete resulting in Reactive Orange 78 (RO 78); and
   f) obtaining the aqueous reactive black mixture,
   wherein steps a) to e) are performed without intermediate purification and at least steps d) and e) are performed under high shear mixing conditions, and
   wherein the combined concentration of RB 5 and RO 78 at the end of step e) is higher than 0.1 mol/L.

2. The one-pot synthesis according to claim 1, wherein in step b) the molar ratio of vinyl sulphone parabase ester:nitrite is within the range of 1:1.001-1:1.2.

3. The one-pot synthesis according to claim 1, wherein in step c) the molar ratio of remaining nitrous acid:sulfamic acid is within the range of 1:1-1:2.

4. The one-pot synthesis according to claim 1, wherein in step d) the molar ratio of diazonium salt:H-acid is within the range of 2.6:1-2.9:1.

5. The one-pot synthesis according to claim 1, wherein in step e) the molar ratio of remaining diazonium salt:acetyl-J-acid is within the range of 1.0:1-1.2:1.

6. The one-pot synthesis according to claim 1, wherein in the obtained aqueous reactive black mixture the molar ratio of RB 5:RO 78 is within the range of 1.3:1-1.7:1.

7. The one-pot synthesis according to claim 1, wherein the nitrite is sodium nitrite.

8. The one-pot synthesis according to claim 1, wherein the acid is hydrochloric acid.

9. The one-pot synthesis according to claim 1, wherein the pH in step b) is lower than 2.

10. The one-pot synthesis according to claim 1, wherein steps a) to e) are performed in the same reaction vessel.

* * * * *